US005278947A

United States Patent [19]

Balga, Jr. et al.

[11] Patent Number: 5,278,947

[45] Date of Patent: Jan. 11, 1994

[54] SYSTEM FOR AUTOMATIC PRINTING OF MAIL PIECES

[75] Inventors: John T. Balga, Jr., Stratford; Kevin L. Strobel, Fairfield, both of Conn.

[73] Assignee: Pitney Bowes Inc., Stamford, Conn.

[21] Appl. No.: 769,907

[22] Filed: Oct. 1, 1991

[51] Int. Cl.[5] .............................................. G06F 15/00

[52] U.S. Cl. ..................................... 395/117; 395/111

[58] Field of Search ............... 395/101, 105, 111, 112, 395/115, 117, 164, 153, 148; 271/9; 400/61, 62, 67, 68, 71, 605, 609, 610

[56] References Cited

U.S. PATENT DOCUMENTS 4,858,907 8/1989 Eisner et al. ........................ 271/124
4,868,757 9/1989 Gil ................................. 364/464.03
4,875,174 10/1988 Olodort et al. ..................... 395/101

FOREIGN PATENT DOCUMENTS 0282359 3/1988 European Pat. Off. ..... B07C 11/00
0341040 3/1989 European Pat. Off. .... G06K 15/02
2308990 4/1975 France ......................... G06F 15/46
2193160A 2/1988 United Kingdom ......... B07C 11/00

OTHER PUBLICATIONS

Modern Office Procedures May 1983 pp. 92, 94, 96.
Hoffman Eitle & Partner, Search Report, Ref. No. 57 986 a/fi, Apr. 13, 1993.

*Primary Examiner*—Arthur G. Evans
*Attorney, Agent, or Firm*—Robert H. Whisker; Melvin J. Scolnick

[57] ABSTRACT

A printing system for printing mail pieces including at least one page having an address. The system includes a printer, a controller, and a feeder for selectively feeding an envelope or a cut sheet to the printer. The controller examines the text of each page to identify a destination address, and when the destination address is found prints it on an envelope for the mail piece. The system also has the capability to identify and print return addresses and the capability to print the envelope either before or after pages included in the mail piece.

15 Claims, 5 Drawing Sheets

SYSTEM FOR AUTOMATIC PRINTING OF MAIL PIECES

BACKGROUND OF THE INVENTION

The subject invention relates to a printing system. More particularly, it relates to a system for printing a mail piece which includes at least one printed sheet and an envelope printed with a destination address, and including a barcode.

As the United States Postal Service, together with the postal services of other countries around the world, moves towards automated mail handling in an effort to contain cost while processing an ever increasing amount of mail, automated equipment which sorts and processes mail on the basis of machine readable postal codes, such as the "zip code" used in the United States, plays an ever more significant role. In the United States, Postal Service regulations provide for a "Postnet" barcode which represents the five or nine digit zip code of the destination address in machine readable form.

Systems have been used or proposed to meet the need to produce mail pieces imprinted with the Postnet barcode, and to enable mailers to obtain the benefit of the discounts offered for such mail. One such system is described in U.S. Pat. No. 4,858,907; to: Eisner et al; issued: Aug. 22, 1989. This patent discloses a system for printing envelopes with addresses including barcodes. The system is controlled by a computer which includes software for converting a zip code included in the address into barcode form and adding this barcode representation to the material to be printed on the envelope.

Another system for printing envelopes with addresses including barcode is disclosed in commonly assigned, co-pending U.S. patent application Ser. No. #420,039; filed Mar. 12, 1990, which describes a system for printing mail pieces which includes a printer for printing sheets and envelope forms and a folder-sealer mechanism for folding the envelope form around the sheets to form a mail piece and a computer; based control system for controlling the printer and folder. In the system of this application, when an operator is creating a file of letters to be printed the operator may designate a selected field within each letter as containing the destination address. The system will then extract the information in this designated field and with it create a new page of material to be printed on the envelope form, and if the address within the designated field includes a zip code the system will add a corresponding barcode to the new page. The system then adds this new page to the file before the file is output. This system, however, requires specially developed software and hardware.

To date, despite extensive efforts, no system has been developed which is suitable for the small to medium size user, such as a small business or professional office; which has an existing system for generating mailings of a few to a few hundred mail pieces for printing by a conventional computer outprint printer, such as a laser printer.

Thus, it is an object of the subject invention to provide a system for printing mail pieces including sheets and envelopes which will be suitable for the small to medium volume user.

BRIEF SUMMARY OF THE INVENTION

The above objects are achieved and the disadvantages of the prior art are overcome in accordance with the subject invention by means of a system which includes a printer for printing text in response to input of signals. The printer has a capability to selectively print either sheets or envelopes. The system further includes a controller for output of a sequence of signals representative of materials to be printed on a sheet which forms part of the mail piece, where the sequence includes a subset of signals representative of an address. The controllers further includes a mechanism for identifying the subset as it is output, a second mechanism responsive to the identifying mechanism for converting the subset into a new sequence representative of the address, and a third mechanism for outputting the new sequence to the printer to control the printer to print the address on an envelope.

In accordance with one aspect of the subject invention the system includes a buffer for storing the sequence prior to output and the mechanism for identifying the subset further includes a mechanism for scanning the sequence as it stored in the buffer prior to output.

In accordance with another aspect of the subject invention the scanning mechanism includes a further mechanism for identifying a character string which conforms to a postal coding standard.

In accordance with still another aspect of the subject invention the system includes a further mechanism for identifying the character string as a valid postal code.

In accordance with another aspect of the subject invention the system forms the destination address to include a line including the postal code and a selected number of proceeding lines of text.

Thus, it can been seen that the above objects are achieved and the disadvantages of the prior art are overcome by means of a system in accordance with the subject invention. Further objects and advantages of the subject invention will be apparent to those skilled in the art from consideration of the detailed description set forth below and the attached drawings.

DETAILED DESCRIPTION OF PREFERRED EMBODIMENTS OF THE SUBJECT INVENTION

Figure 1:
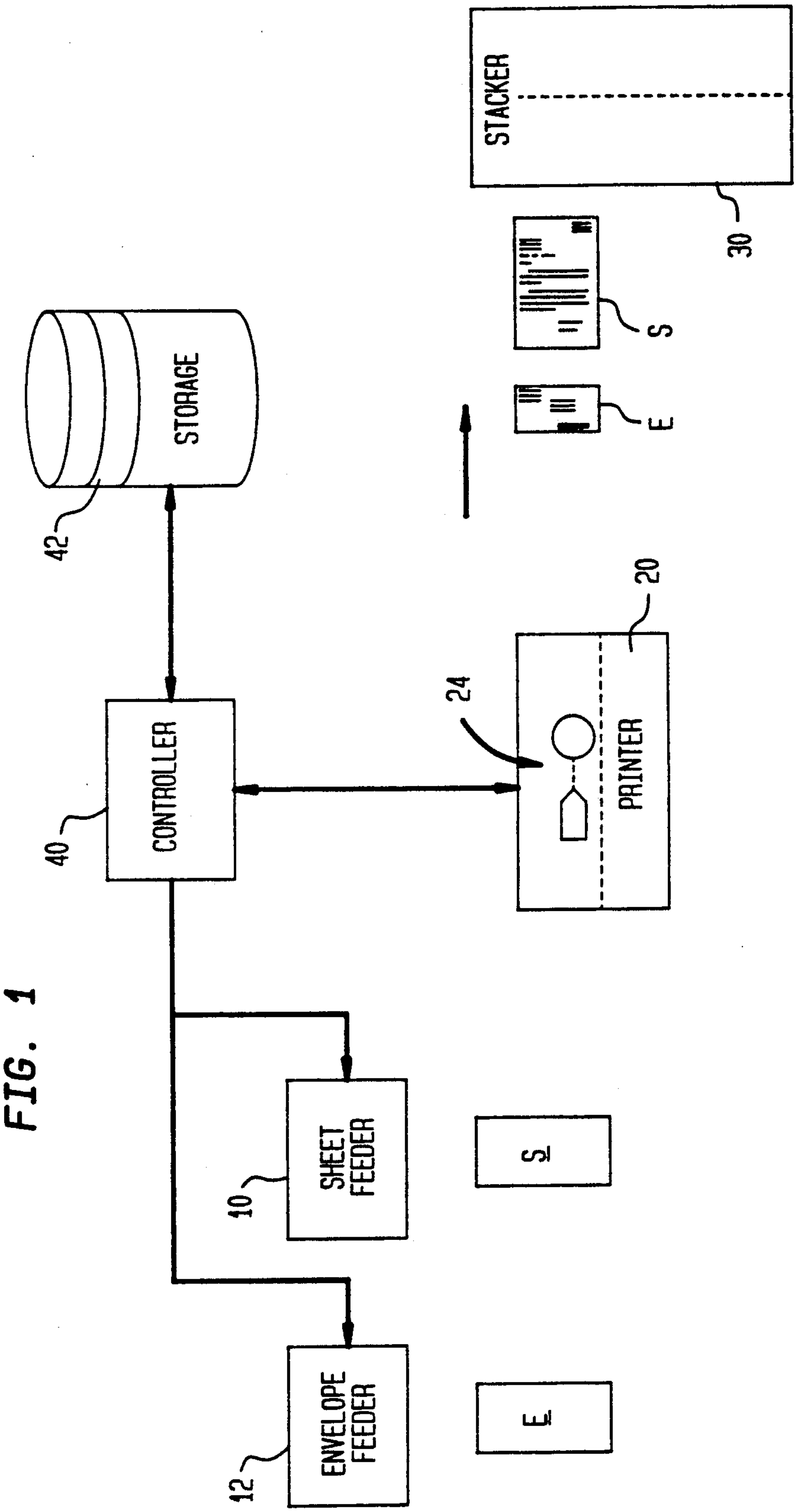
FIG. 1 shows a schematic block diagram of a printing system in accordance with the subject invention.

FIG. 1 shows a system in accordance with the subject invention which includes conventional sheet feeder 10 and convention envelope feeder 12 which respectively feed sheets S and envelopes E to printer 20, which is preferably a conventional laser printer or similar printing system for printing output of a microcomputer or the like. Printer 20 includes a conventional print engine 24, which may be a laser print engine or similar mechanism for printing sheets S and envelopes E.

After printing sheets S and envelope E are output to a conventional stacker 30 for further processing. Sheet feeder 10, envelope feeder 12 and printer 20 are controlled in a conventional manner by controller 40 to selectively print either sheets S or envelopes E as will be described below. Controller 40 also includes storage 42 for storing a database of valid zip codes to be used to validate strings of digits identified in the text of materials to be printed, as will be described below.

Preferably controller 40 includes a conventional personal computer and storage 42 includes a conventional disk drive.

Figure 2:
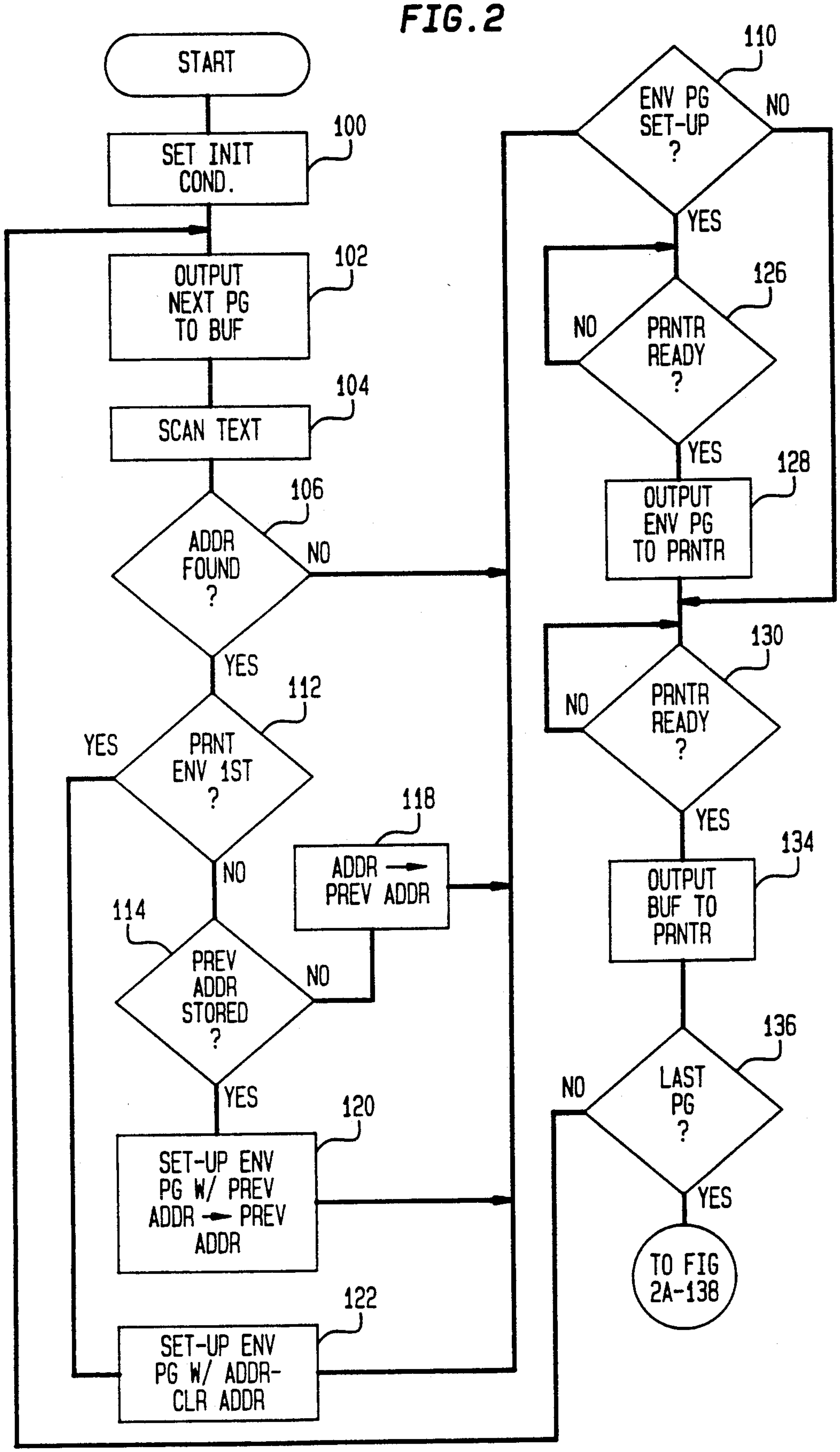
FIGS. 2 and 2*a* show a flow chart of the operation of system 1 in printing a stream of mail pieces.

Turning now to FIG. 2, at 100 controller 40 initializes the system by establishing boundaries for a page buffer, assuring that an appropriate printer 20 is connected and energized, and taking other necessary, conventional steps.

For purposes of the remaining description, it is assumed that a sequence of pages representing printed sheets to be comprised in mail pieces has been composed in a conventional manner, either by system 40 or off-line. It is further assumed, as is conventional in business correspondence, that a page for each mail piece includes at least a destination address and may include a return address. Generation of such pages of material to be printed on sheets for inclusion in a mail piece is well known in the art and need not be described further here for an understanding of the subject invention.

Next, at 102 system 40 outputs the next page to a page buffer. At 104 the text in the buffer is scanned to determine if an address is included, and at 106 system 40 tests to determine if an address has been found in the page.

Those skilled in the art will recognize that the only alteration necessary to any conventional printer output program for use with the subject invention is to define the output buffer, which normally contains the next page to be printed, to be the page buffer at 102.

At 106 system 40 tests to determine if an address has been found in scanning the page stored in the page buffer, and if no address has been found goes to 110.

If an address has been found then at 112 system 40 tests to determine if the envelope for the mail piece is to be printed first. If the envelope is not to be printed first then at 114 system 40 tests to determine if a previous address has been stored. If no previous address has been stored then the address found is stored as the previous address and system 40 goes to 110.

If a previous address has been stored then at 120 system 40 sets up an envelope page using the previously found address and stores the last found address as the previously found address, then goes to 110.

If at 112 it is determined that the envelope is to be printed first then at 122 system 40 sets up the envelope page using the last found address and clears the last found address, then goes to 110.

At 110 system 40 tests to determine if an envelope page has been set up and, if so, at 126 tests to determine if printer 20 is ready. If printer 20 is ready then at 128 system 40 outputs the envelope page to printer 20 in a conventional manner, which need not be discussed further here for an understanding of the subject invention.

After output of the envelope page at 128, or if no envelope page is found to be set up at 110, then at 130 system 40 tests to determine if printer 20 is ready, and if not loops. When printer 20 is ready then at 134 controller 40 outputs the buffer to printer 20, to print the page.

(Those skilled in the art will recognize that control of printer 20 by controller 40 to print material output is conventional, and further that when an envelope page is to be printed then feeder 12 will be selected and when a page is to be printed then feeder 10 will be selected in a conventional manner, which need not be described further here for an understanding of the subject invention.)

Then at 136 system 40 tests to determine if this is the last page, and if not, returns to 102, and otherwise goes to 138.

Figure 2A:
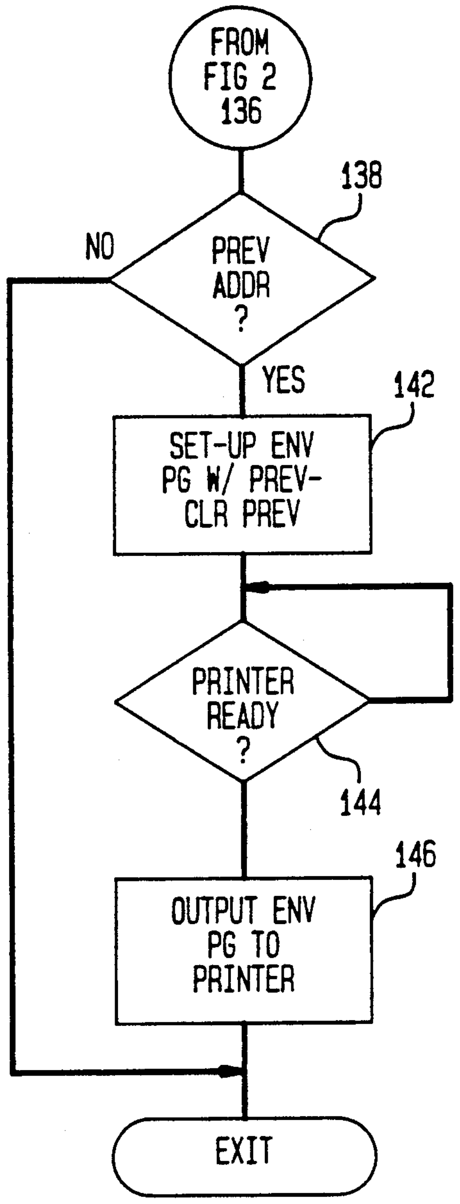

Turning to FIG. 2A, at 138 system 40 tests to determine if a previous address remains unprinted. If so, then at 142 system 40 sets up the envelope page with the previous address and clears the previous address. Then at 140 system 40 tests to determine if printer 20 is ready, and if not loops. Otherwise, at 146 controller 40 outputs the envelope page to printer 20 and exits.

If no previous address is detected at 138 then system 40 immediately exits.

Figure 3:
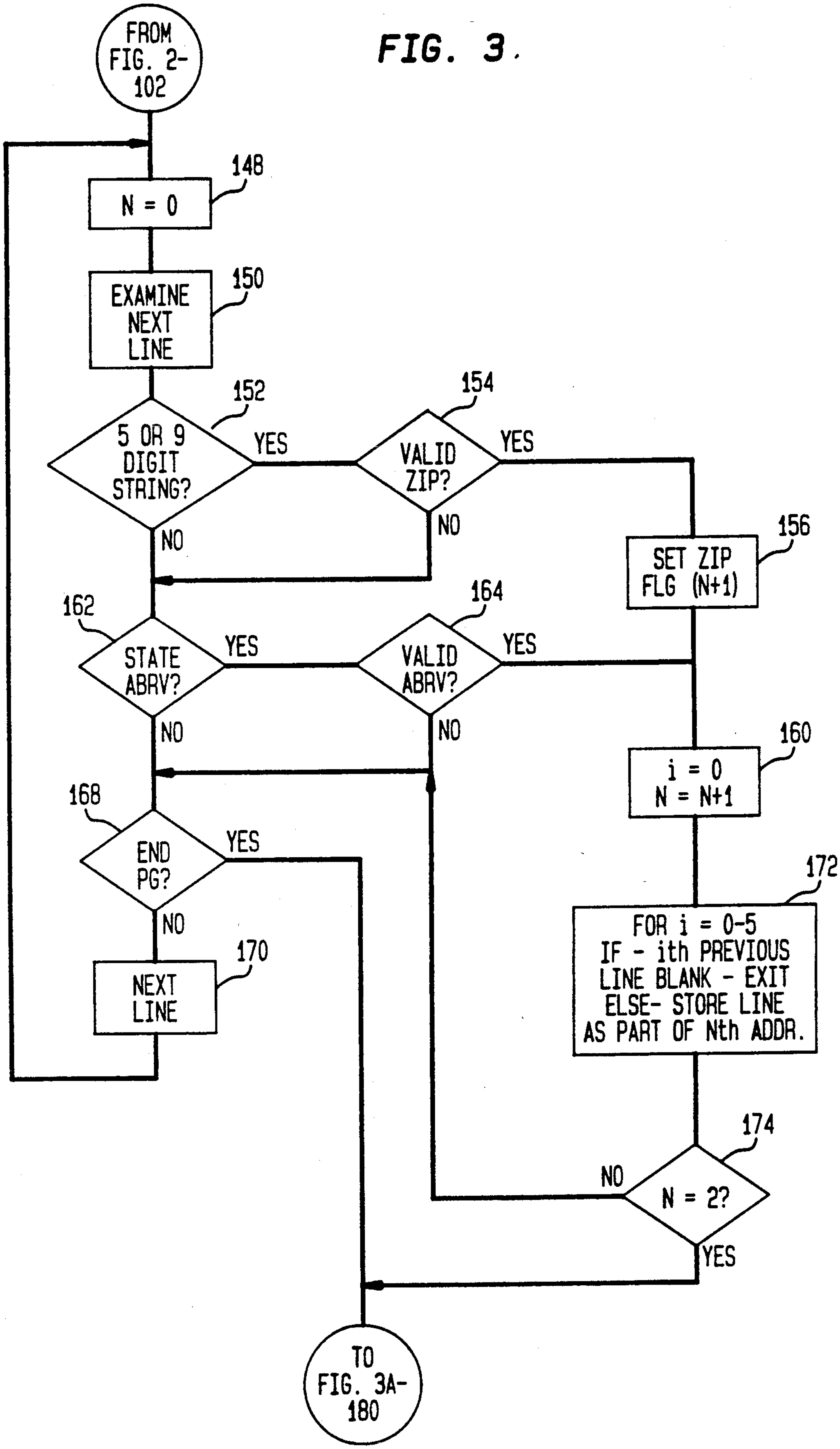
FIGS. 3 and 3*a* show a more detailed flow chart of the operation of the system of FIG. 1 in scanning a page of text to be printed to identify an address.

Turning to FIG. 3, a more detailed flow chart of the operation of system 40 in scanning a page in the page buffer is shown.

At 148 an index N is set to zero. At 150 system 40 examines the next line of text to determine if it contains a character string which conforms to a postal coding standard. Typically, for embodiments intend for the U.S. market, such a character string would be a five or nine digit string representative of a zip code. At 152 system 40 thus determines if such a five or nine digit string has been detected. If a five or nine digit string has been detected then at 154 system 40 tests the string to determine if it represents a valid zip code. If the zip code is valid then at 56 a flag corresponding to N+1 is set, and system 40 goes to 160.

If no valid zip code is found then at 162 system 40 tests the line for a state abbreviation, and if one is found at 164 tests to determine if it is a valid abbreviation, and if so goes to 160.

Figure 3A:
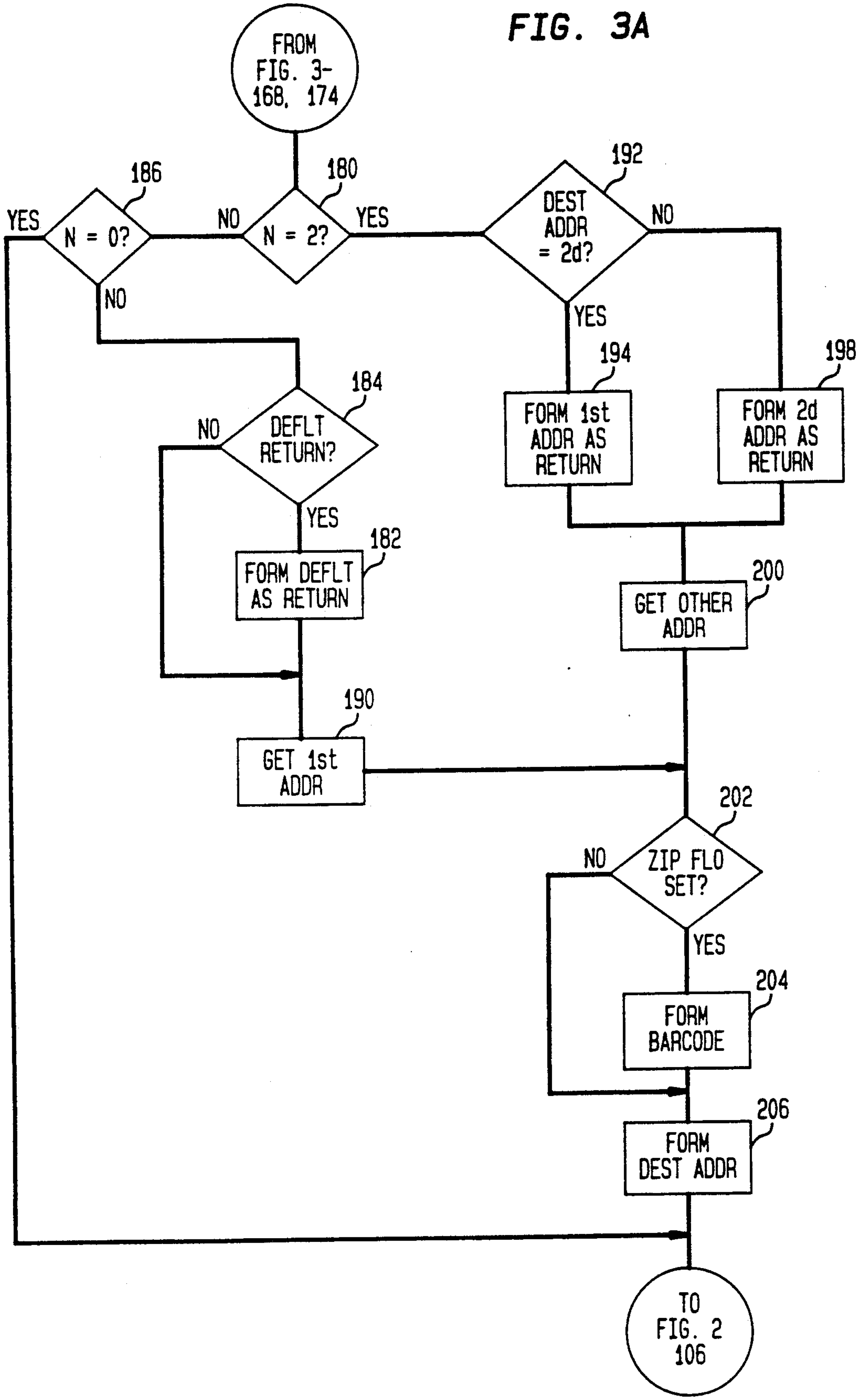

If no valid abbreviation is found then at 168 system 40 tests to determine if the end of the page has been reached, and if so goes to 180 (shown in FIG. 3A). Otherwise, system 40 returns to 150 to examine the next line of text.

At 160 system 40 sets an index i equal to zero and index N equal to N+1, and then at 162; for i equal to zero through five, examines the ith previous line to determine if it is blank, and if so exits 172, otherwise the ith line is stored as part of the nth address.

Thus, it can be seen that the routine shown in FIG. 3 stores any line containing either a valid zip code or a valid state abbreviation together with up to five previous lines as an address.

At 174 system 40 tests to determine if N is equal to two. If N is not equal to 2 then system 40 returns to 168 to determine if the end of the page has been reached. If two addresses have been found system 40 goes to 180 (shown in FIG. 3A).

Those skilled in the art will recognize that the test at 174 is equivalent to an assumption that, consistent with normal practice for business letters, invoices, etc., the first two addresses found on a page will represent the destination and return address if any.

At 180 system 40 tests to determine if N is equal to 2, and if not, at 182 tests to determine if N is equal to zero. If N is equal to zero system 40 immediately goes to 106 in FIG. 2.

Otherwise, N is equal to 1 and system 40 goes to 184 to determine if a default return is specified. If a default return is specified then at 186 system 40 forms the default return as the return address for the envelope page. Then, or if no default return is specified, at 190 system 40 gets the first address found on the page and goes to 202.

If at 180 N is found equal to 2 then at 192 system 40 tests to determine if the destination address is to be considered the second address found. If so, then at 194 the first address is formed as the return address, otherwise at 198 the second address is formed as the return address. Then at 200 system 40 gets the other address.

If at 202 the zip flag is set for the address determined as the destination address then at 204 system 40 forms the appropriate corresponding barcode and goes to 206 then, or if no zip flag is set, at 206 system 40 forms the destination address where the envelope page and exits to 106 in FIG. 2.

The above description of preferred embodiments has been given by way of illustration only, and those skilled in the art will recognize numerous other embodiments of the subject invention from the detailed description set forth above and the attached drawings. Particularly, it is within the contemplation of the subject invention that address within a page maybe set off by non-printing codes rather than identified by zip codes or state abbreviations. Accordingly, limitations on the subject invention are to be found only in the claims set forth below.

What is claimed is:

1. A system for printing a sequence of mail pieces, said mail pieces each including one or more pages and an envelope, said system comprising:

a) a printer for printing text in response to input of signals, said printer having a capability to selectively print on either sheets or envelopes; and b) control means for outputting a sequence of said signals representative of material to be printed on said sheets to form said pages; said sequence including subsets of signals representative of addresses for said mail pieces, said control means further comprising b1) means for identifying said subsets from inherent characteristics of said subsets as they are output;

b2) first means, responsive to said identifying means, for converting said subsets into new sequences representative of said addresses and automatically identifying subsequences of said signals corresponding to said pages of said mail pieces; and b3) means for inserting said need new sequences into said sequence adjacent to corresponding subsequences to form an expanded sequence of signals and for outputting said expanded sequences to said printer to print said material on said sheets to form said pages and said to print addresses on said envelopes, said envelopes being output by said printer adjacent to corresponding pages.

2. A system as described in claim 1 further comprising means for temporary storage of copies of said subsets and wherein said envelopes are printed subsequent to said sheets.

3. A system as described in claim 1 further comprising means for temporarily interrupting said outputting of said signals and wherein said envelopes are printed prior to said sheets.

4. A system as described in claims 1, 2, or 3 wherein said sequence is stored in a buffer prior to output and said means for identifying further comprises means for scanning said sequence as it is stored in said buffer.

5. A system as described in claim 4 wherein said scanning means further includes means for identifying a character string which conforms to a postal coding standard.

6. A system as described in claim 5 wherein said identifying means further includes means for validating said character string as a postal code.

7. A system as described in claim 6 wherein said scanning means further comprises means for temporary storage of a first subsequence of said new sequences of said signals representative of a line of text including said postal code.

8. A system as described in claim 7 wherein said temporary storage means further comprises means for storing additional, selected sequences of said new sequences, representative of additional lines of test, with said first subsequence.

9. A system as described in claim 8 wherein said additional, selected subsequences represent lines immediately preceding said line of text including said zip code, said preceding lines being the lesser of either:

(a) a predetermined number of lines, or, (b) all lines which are also subsequent to the first blank line prior to said line including said zip code.

10. A system as described in claims 1, 2 or 3 wherein said converting means further comprises means for determining if said subsets include representation of either one, or of two addresses.

11. A system as described in claim 10 further comprising means, responsive to said determining means, for, if a subset includes two of said representations, selectively formatting a one of said representations as a return address to be printed on said envelope.

12. A system as described in claim 10 further comprising means, responsive to said determining means, for, if a subset includes only one of said representations, formatting a default address as a return address to be printed on said envelope.

13. A system as described in claims 1, 2 or 3 wherein said converting means further comprises means for formatting a representation of an address included in a subset as a destination address to be printed on said envelopes.

14. A system as described in claim 13 further comprising means for determining if said representation of an address includes a further, character representation of a postal code and for, if said character representation is found, formatting a barcode or other graphic representation of said postal code for printing on said envelope.

15. A system as described in claim 1 further comprising means for selectively controlling said printer to print said envelope either before or after said sheets.

* * * * *